United States Patent
Barabash et al.

(10) Patent No.: US 9,559,966 B2
(45) Date of Patent: Jan. 31, 2017

(54) REDUCING NETWORK AND APPLIANCES LOAD THROUGH COOPERATIVE CONTROL PLANE DECISIONS

(71) Applicant: International Business Machines Corporation, Armonk, NY (US)

(72) Inventors: Katherine Barabash, Haifa (IL); Yaniv Ben-Itzhak, Kiryat-Yam (IL); Rami Cohen, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 14/301,349

(22) Filed: Jun. 11, 2014

(65) Prior Publication Data

US 2015/0365327 A1 Dec. 17, 2015

(51) Int. Cl.
G01R 31/08 (2006.01)
H04L 12/813 (2013.01)
H04L 12/715 (2013.01)

(52) U.S. Cl.
CPC ............... *H04L 47/20* (2013.01); *H04L 45/64* (2013.01)

(58) Field of Classification Search
CPC ....................................................... H04L 47/10
See application file for complete search history.

(56) References Cited

U.S. PATENT DOCUMENTS

| 8,291,495 B1 | 10/2012 | Burns et al. | |
|---|---|---|---|
| 2009/0245130 A1* | 10/2009 | Bing | H04L 43/0894 370/253 |
| 2013/0223444 A1 | 8/2013 | Liljenstolpe et al. | |

FOREIGN PATENT DOCUMENTS

| WO | 2005/060211 | 6/2005 |
|---|---|---|
| WO | 2010/031084 | 3/2010 |

OTHER PUBLICATIONS

Greenberg et al., "VL2: a scalable and flexible data center network", ACM SIGCOMM Computer Communication Review—SIGCOMM '09, vol. 39 Issue 4, Oct. 2009 , pp. 51-62.

Sherry et al., "Making middleboxes someone else's problem: Network processing as a cloud service", Sigcomm '12 Proceedings of the ACM SIGCOMM 2012 conference on Applications, technologies, architectures, and protocols for computer communication, pp. 13-24.

Gibb et al., "Outsourcing network functionality", HotSDN '12 Proceedings of the first workshop on Hot topics in software defined networks, pp. 73-78, 2012.

(Continued)

*Primary Examiner* — Samina Choudhry
(74) *Attorney, Agent, or Firm* — Robert C. Bunker (57) ABSTRACT

Systems and methods for forwarding data packets in a communications network, the method comprising: providing information included in a first portion of a data packet to a network policy unit, in response to a forwarding device receiving a data packet to be forwarded over one or more network routes; forwarding the data packet according to a flow policy, in response to the forwarding device receiving the flow policy from the network policy unit, wherein the flow policy applied to the data packet by the forwarding device is determined by the network policy unit based on the network policy unit performing an analysis of the information included in the first portion of the data packet in view of policy information provided to the network policy unit.

11 Claims, 4 Drawing Sheets

(56) References Cited

OTHER PUBLICATIONS

IBM, "Load balancing consultant for packet forwarding devices", An IP.com Prior Art Database Technical Disclosure, Jul. 4, 2001.
Gember et al., "Challenges in unifying control of middle box traversals and functionality", Large-Scale Distributed Systems and Middleware (LADIS), Madeira, Portugal, 2012.
Prabhu et al., "Toward software-defined middle box networking", HotNets-XI Proceedings of the 11th ACM Workshop on Hot Topics in Networks, pp. 7-12, 2012.
Choisi et al., "Network functions virtualization", Network Functions Virtualisation—Introductory White Paper Issue 1, published on Oct. 22-24, 2012 at the "SDN and OpenFlow World Congress", Darmstadt-Germany.
Aditya et al., "Stratos: virtual middle boxes as first-class entities", University of Wisconsin-Madison Department of Computer Sciences, Part of CS Technical Reports, Jun. 18, 2012.

* cited by examiner

REDUCING NETWORK AND APPLIANCES LOAD THROUGH COOPERATIVE CONTROL PLANE DECISIONS

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to reducing the network and the appliances load through cooperative control plane decisions.

BACKGROUND

Modern networks may be configured for the purpose of data communication and to provide advanced services such as firewall protection, intrusion detection, acceleration, encryption, multiplexing, steering, load-balancing, caching, compression and optimization. Traditionally, advanced services were implemented as hardware appliances and were inserted at or near the relevant network components, such that all the traffic entering or leaving a network was enforced by a set of pre-installed appliances.

Virtualization has led to large-scale consolidated data centers running multi-tenant workloads. In such environments, a relatively large portion of the data flow is internal to the data center. As such, advanced network services are inserted inside the data center to take into account workload life cycle changes (e.g., migration, elastic growth, etc). Network functions (NF) that support the advanced network services may be virtualized for the purpose of dynamic deployment and migration. As a result, in modern networking environments (e.g., enterprise data centers), both hardware and software NF appliances may be deployed in the path of network traffic.

Unfortunately, hardware and software NF appliances are data and computation intensive and introduce substantial overhead in network management and traffic, leading to an increase in the response time latency. In a virtualized environment, the latency is even worse due to the additional virtualization overhead. When network size increases, the overall network load increases as well and more data requests must be serviced by the appliances. This increases the computational and the management costs and results in bandwidth shortage in the network, thus limiting the possibility for scaling the availability of the advanced services.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Machines, systems and methods for forwarding data packets in a communications network are provided. The method comprises providing information included in a first portion of a data packet to a network policy unit, in response to a forwarding device receiving a data packet to be forwarded over one or more network routes; forwarding the data packet according to a flow policy, in response to the forwarding device receiving the flow policy from the network policy unit, wherein the flow policy applied to the data packet by the forwarding device is determined by the network policy unit based on the network policy unit performing an analysis of the information included in the first portion of the data packet in view of policy information provided to the network policy unit.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
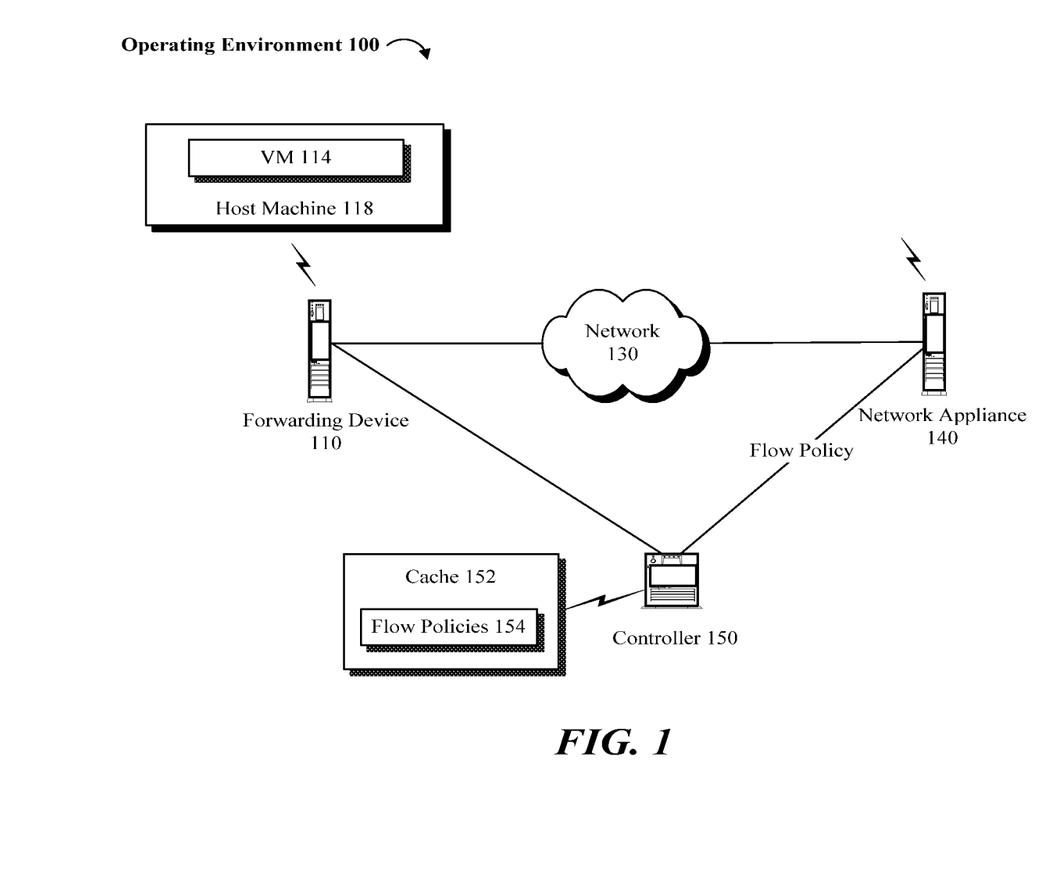
FIG. 1 illustrates an exemplary computing environment in accordance with one or more embodiments, wherein a controller is in communication with network forwarding devices and with network appliances to enforce flow policy.

Referring to FIG. 1, in accordance with one embodiment, a controller 150 may be provided in a network 130 to communicate with network forwarding devices 110 (e.g., routers, physical and virtual switches, network interface controller, etc.) and network appliances 140 (e.g., firewalls, intrusion detection or prevention systems, etc.). As provided in further detail below, network functionality may be implemented to prevent or limit forwarding of data packets through network appliances 140, where a security policy is enforced at the forwarding devices 110, optionally, in consultation with the controller 150.

In one implementation, when the network appliance 140 accepts a flow as legitimate, the network appliance 140 may be configured to communicate the applicable flow policies for forwarding data packets to the controller 150 (or the forwarding devices 110). In turn, the controller 150 communicates the flow policy to one or more forwarding devices 110. Once a forwarding device 110 is aware of the flow policy, then the forwarding device 110 directly forwards the data packet to the destination, instead of sending the data packet through a corresponding network appliance 140, which would have otherwise routed the data packet to the destination.

Alternatively, if the flow policy dictates, the network forwarding device 110 may decide to block a data packet from being transmitted to a destination. In this case, the controller 150 communicates drop policy to the source forwarding device 110. If the route to the destination would have been through a corresponding network appliance 140, that would have ultimately rejected the data packet, the above approach prevents the transmission of the data packet to the corresponding network appliance 140 in the first place, and also eliminates the overhead associated with processing of the data packet by the network appliance 140. In this manner, network congestion may be reduced as data transmission bandwidth across the entire network is improved.

Figure 2:
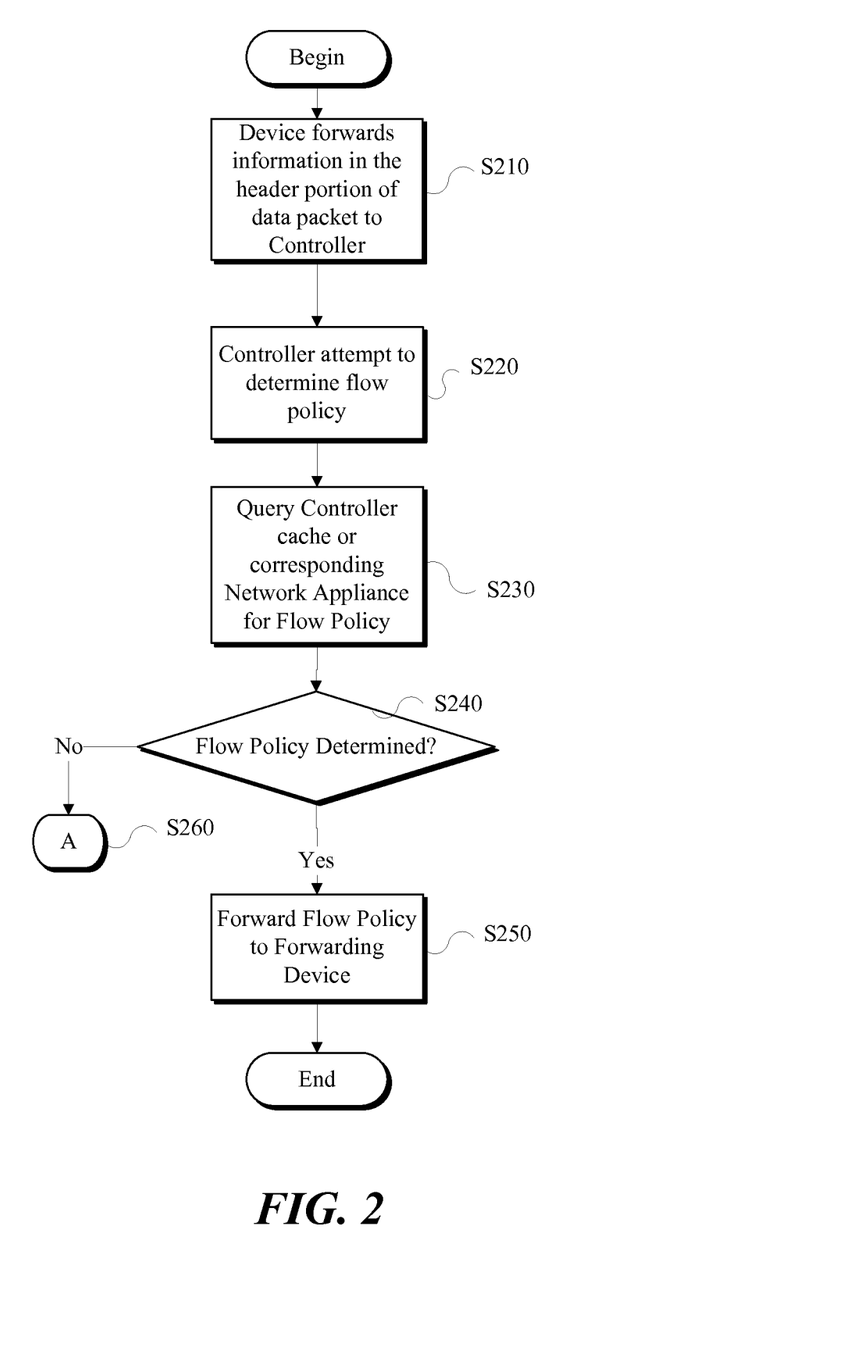
FIG. 2 is an exemplary flow diagram of a method of determining flow policy, in accordance with one embodiment.

Referring to FIGS. 1 and 2, a forwarding device 110 may communicate with a host machine 118 to receive a data packet generated by a virtual machine (VM) 114 running on the host machine 118. Upon receipt of a data packet, the forwarding device 110 may forward the information in, desirably the header portion of the data packet to the controller 150 (S210). In a different implementation, the entire data packet, including information in the payload portion of the data packet may be transferred to the controller 150. The controller 150 may be configured to analyze data included in the header of the data packet in an attempt to determine flow policy for the data packet (S220). The controller 150 may determine the flow policy based on a query to the corresponding network appliance 140, or based on accessing flow policies 154 stored in a data structure (e.g., a cache 152 or a forwarding table) (S230).

As such, desirably based on the information included in the header portion of a data packet, the controller 150 may determine and forward the flow policy to the respective forwarding device 110 (S240, S250). If the controller 150 is not able to determine the flow policy based on the above measures, then a remedial process may be implemented (e.g., the data packet may be routed through the network appliance as an option) (S260). Once the forwarding device 110 receives the flow policy from the controller 150, the forwarding device 110 applies the flow policy to the data packet and either: (1) rejects the data transfer request, or (2) transfers the data packet according to the flow policy, as dictated by the controller, to the destination without forwarding the data packet to the corresponding network appliance 140. In this manner, the additional overhead associated with more traditional models that require the transmission of the application data included in the payload portion of the data packet to the controller 150 is eliminated.

As noted earlier, in one implementation (e.g., if the controller is not configured or is unable to determine flow policy), either the entire data packet or the information in the header portion of the data packet may be transmitted to the corresponding network appliance 140, instead of the controller 150. The network appliance 140 determines the flow policy to help relieve the controller 150 from having the responsibility for determining flow policy. The flow policy as determined by the network appliance 140 may be communicated to the controller 150 or directly to the forwarding device 110. Once the forwarding device 110 is provided with the flow policy (either by way of the network appliance 140 or the controller 150), then the forwarding device 110 applies the flow policy to the data packet as provided earlier.

In one embodiment, the system may be configured such that a forwarding device 110 that is closest to the host machine 118 may be reconfigured to process data packets as required according to the flow policy when policy decision is made by the network appliance. Alternatively, depending on the network appliance decision and the flow's route in the network, one or more additional network forwarding devices along the flow's route may be reconfigured by the controller 150 to enforce the policy.

In the above, the applicable concepts and methodologies are disclosed in accordance with a simplified approach and with a limited scope of discussion or implementation. In the following, more detailed embodiments are provided by way of example to provide a better understanding of the concepts and functions disclosed earlier. It is worthy to emphasize that the details and features disclosed below in the example embodiments or implementations should not be construed as limiting the scope of the claimed subject matter to the particulars details.

In accordance with one example implementation, a software defined network (SDN) based computing environment (e.g., a data-center) may include two appliances, including a firewall and an intrusion detection system (IDS). A data flow including one or more data packets may be processed first by the firewall which decides whether the flow should be (a) denied and dropped at the firewall, (b) further inspected by the IDS, or (c) allowed and transmitted directly to the destination. If transmitted to the IDS, the IDS may decide whether to deny or accept the flow. In this example, assume that the appliances will inform the SDN controller 150 about the flow policy.

In a first scenario, the flow of data from a forwarding device may be denied either by the firewall or the IDS. Once the SDN controller 150 is informed about this decision, the SDN controller 150 may decide to modify the flow entries on the flow's route to drop any data packets in the identified flow. In other words, the data packets in the denied flow may be refused transmission from by the forwarding device 110 (e.g., the device closest to the source of the flow) to prevent the data packets from being transmitted and denied by one of the network appliances 140 down the road. In this manner, a lower load may be maintained over the appliances and the network.

In a second scenario, the firewall may decide that the flow is required for further inspection by the IDS. The firewall may thus forward the packet to the IDS. If the IDS decides that the flow is required for continuous packet inspection, the SDN controller 150 may re-route the flow directly to the IDS without going through the firewall. Therefore, the firewall load may be reduced as well as the load on the links connecting the updated forwarding device 110 to the firewall and the links connecting the firewall to the IDS. The flow's latency may be also reduced, since the flow is transmitted directly to the IDS. As such, the additional transmission time to and from the firewall and the firewall computation time is eliminated.

In a third scenario, the above scheme may be also applied where the flows are allowed. When the flow is allowed, either by the firewall or the IDS, the SDN controller 150 may re-route the flow directly to its destination. Therefore, both the appliances loads and the flow's latency may be reduced. In one implementation, once a flow is initiated, the SDN client sends a request packet to the SDN controller 150. The SDN controller 150 determines the flow's policy and asks the corresponding appliances (e.g., firewall, deep packing inspection devices, etc.) for a decision regarding the flow. According to the appliances' decision, the SDN controller 150 computes the flow entries of the SDN clients along the packet's route. This option may be applied for appliances which inspect the packet's header, for example.

In another implementation, once a flow is initiated, the first packet or the first set of packets may be sent through the corresponding appliances (e.g., firewall) according to a corresponding flow policy. Then, the appliances update the SDN controller 150 with their decisions, and as a result the SDN controller 150 recalculates and modifies the forwarding tables of the corresponding SDN clients. This option may be applied for appliances that inspect the packets' payload, such as IDSs.

Since the flow's route might change during flow's transmission, packet reordering may take place. To manage packet reordering, the origin host may store the first packet, which triggers the appliances to send their decision to the SDN controller 150. Then, once the SDN controller 150 modifies the origin host, the host may resend the first packet or the first set of packets along with the rest of the packets in the flow. As such, packet ordering may be preserved as an option to manage packet reordering in this particular scenario. In alternative embodiments, any other known mechanism to deal with packet reordering may be also applied.

Referring to FIG. 2, in one embodiment, the controller 150 stores the different network appliances decisions in a cache 152. Once a host machine 118 or a forwarding device 110 submits a request for a flow policy, the controller 150 either (1) informs the forwarding device 110 according to flow policies stored in the cache 152 (e.g., flow policies in a forwarding table), or (2) if the flow policy table in the cache 152 doesn't include any flow policies for the respective flow, the controller 150 asks a corresponding network appliance 140 to provide the flow policy. A timeout period may be set for one or more cache entries in the cache 152, such that the flow enforcement may be inspected after the expiration of the timeout period. The network appliance 140 may return a flow policy to the controller 150 or directly to the forwarding device 110, or alternatively demand to transmit the flow through on its own for further inspection and policy resolution.

Using the above process, advantageously, flow transmission over the data plane may be reduced by way of managing the communications from the forwarding device 110 to the controller 150 and from the controller 150 to the network appliance 140 through the control plane. The controller 150 may be implemented to cache the network appliances' policy resolutions as noted above and help reduce the traffic and load from the network appliances by returning the proper policy to the hosts or forwarding devices 110 instead of the network appliances 140.

According to the above implementations, advantageously, the separation of the decision point and the enforcement point in a network is achieved, through communicating the decision made by the appliance to the forwarding elements located as close as possible to the packet's source, either directly, or through the controller 150.

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3A:
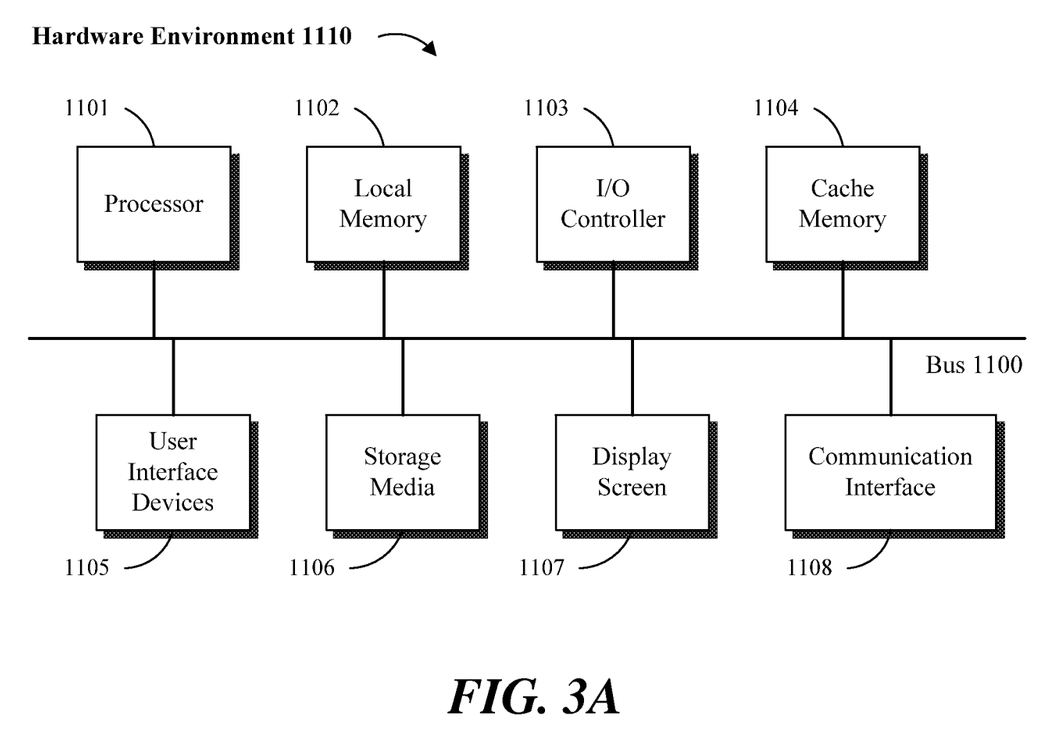
FIGS. 3A and 3B are block diagrams of hardware and software environments in which the disclosed systems and methods may operate, in accordance with one or more embodiments.
Figure 3B:
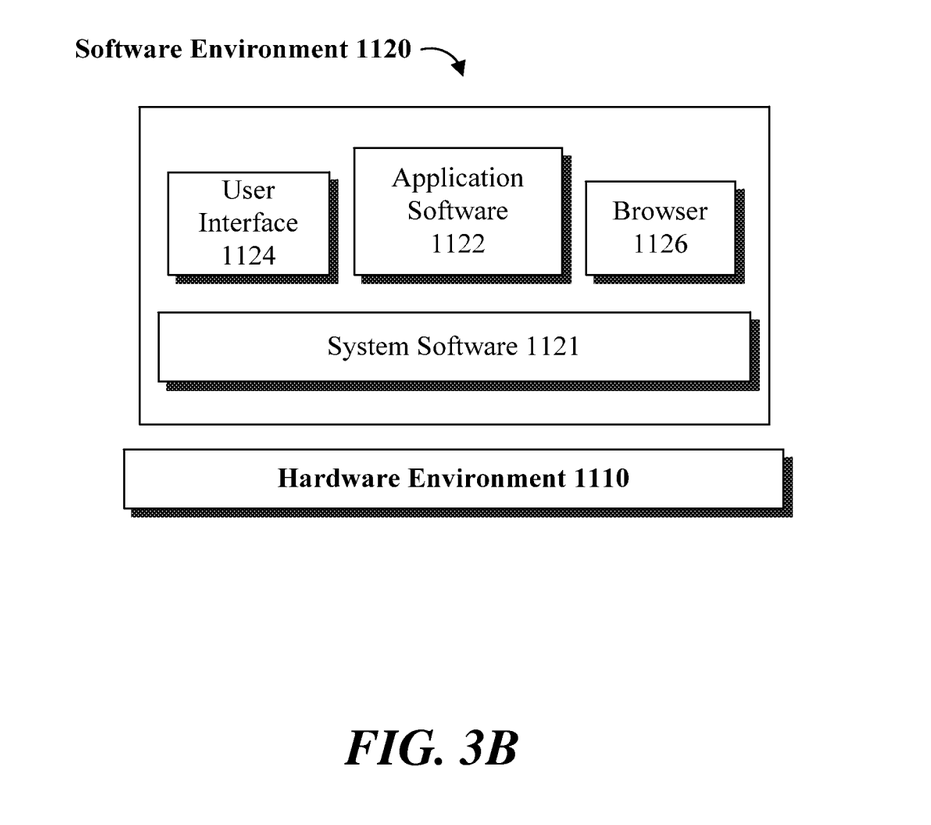

Referring to FIGS. 3A and 3B, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3A, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/ write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105 (e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 3B, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, micro-code, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for forwarding data packets in a communications network, the method comprising:
providing information included in a first portion of a data packet to a standalone network policy unit, in response to a standalone forwarding device receiving a data packet to be forwarded over one or more network routes;
forwarding the data packet according to a flow policy, in response to the standalone forwarding device receiving the flow policy from the standalone network policy unit,
wherein the flow policy applied to the data packet by the standalone forwarding device is determined by the standalone network policy unit based on the standalone network policy unit performing an analysis of the information included in the first portion of the data packet in view of policy information provided to the standalone network policy unit, and wherein the flow policy is retrieved by the standalone network policy unit based on a query to a network appliance, wherein the policy unit is a controller that has access to policy flow information stored in a cache, wherein the controller stores the policy flow information in the cache based on information provided to the controller via the network appliance configured for controlling flow of data packets through the communications network, wherein the controller provides the information included in the first portion of the data packet to the network appliance, wherein the network appliance, in response to receiving the information included in the first portion of the data packet, determines the flow policy associated with the data packet, wherein the network appliance forwards the flow policy to at least one of the controller or the standalone forwarding device.

2. The method of claim 1, wherein the policy unit is a controller that has access to policy flow information provided via the network appliance configured for controlling flow of data packets through the communications network.

3. The method of claim 1, wherein the policy unit is the network appliance configured for controlling flow of data packets through the communications network.

4. The method of claim 1, wherein the first portion of the data packet is the header portion of the data packet.

5. The method of claim 1, wherein the first portion of the data packet is at least one of the header portion of the data packet, the payload portion of the data packet or the entire data packet.

6. A system for forwarding data packets in a communications network, the system comprising:
   a circuit for providing information included in a first portion of a data packet to a standalone network policy unit, in response to a standalone forwarding device receiving a data packet to be forwarded over one or more network routes;
   a circuit for forwarding the data packet according to a flow policy, in response to the standalone forwarding device receiving the flow policy from the standalone network policy unit,
   wherein the flow policy applied to the data packet by the standalone forwarding device is determined by the standalone network policy unit based on the standalone network policy unit performing an analysis of the information included in the first portion of the data packet in view of policy information provided to the standalone network policy unit and wherein the flow policy is retrieved by the standalone network policy unit based on a query to a network appliance, wherein the policy unit is a controller that has access to policy flow information stored in a cache, wherein the controller stores the policy flow information in the cache based on information provided to the controller via the network appliance configured for controlling flow of data packets through the communications network, wherein the controller provides the information included in the first portion of the data packet to the network appliance, wherein the network appliance, in response to receiving the information included in the first portion of the data packet, determines the flow policy associated with the data packet, wherein the network appliance forwards the flow policy to at least one of the controller or the standalone forwarding device.

7. The system of claim 6, wherein the policy unit is a controller that has access to policy flow information provided via the network appliance configured for controlling flow of data packets through the communications network.

8. The system of claim 6, wherein the policy unit is the network appliance configured for controlling flow of data packets through the communications network.

9. A computer program product comprising a non-transitory computer readable storage medium having a computer readable program, wherein the computer readable program when executed on a computer causes the computer to:
   provide information included in a first portion of a data packet to a standalone network policy unit, in response to a standalone forwarding device receiving a data packet to be forwarded over one or more network routes;
   forward the data packet according to a flow policy, in response to the standalone forwarding device receiving the flow policy from the standalone network policy unit, wherein the flow policy applied to the data packet by the standalone forwarding device is determined by the standalone network policy unit based on the standalone network policy unit performing an analysis of the information included in the first portion of the data packet in view of policy information provided to the standalone network policy unit, and wherein the flow policy is retrieved by the standalone network policy unit based on a query to a network appliance, wherein the policy unit is a controller that has access to policy flow information stored in a cache, wherein the controller stores the policy flow information in the cache based on information provided to the controller via the network appliance configured for controlling flow of data packets through the communications network, wherein the controller provides the information included in the first portion of the data packet to the network appliance, wherein the network appliance, in response to receiving the information included in the first portion of the data packet, determines the flow policy associated with the data packet, wherein the network appliance forwards the flow policy to at least one of the controller or the standalone forwarding device.

10. The computer program product of claim 9, wherein the policy unit is a controller that has access to policy flow information provided via the network appliance configured for controlling flow of data packets through the communications network.

11. The computer program product of claim 9, wherein the policy unit is the network appliance configured for controlling flow of data packets through the communications network.

* * * * *